United States Patent
Yan et al.

(10) Patent No.: US 9,984,246 B2
(45) Date of Patent: May 29, 2018

(54) DIFFERENTIAL HIERARCHICAL-BASED PASSWORD SECURITY MECHANISM FOR MOBILE DEVICE

(71) Applicant: International Business Machines Corporation, Armonk, NY (US)

(72) Inventors: Shunguo Yan, Austin, TX (US); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 14/672,941

(22) Filed: Mar. 30, 2015

(65) Prior Publication Data

US 2016/0292461 A1    Oct. 6, 2016

(51) Int. Cl.
  *G06F 7/04*      (2006.01)
  *G06F 21/62*     (2013.01)
  *G06F 21/31*     (2013.01)

(52) U.S. Cl.
  CPC .......... *G06F 21/6218* (2013.01); *G06F 21/31* (2013.01)

(58) Field of Classification Search
  CPC .............................. G06F 21/6218; G06F 21/31
  See application file for complete search history.

(56) References Cited

U.S. PATENT DOCUMENTS

| | | | |
|---|---|---|---|
| 5,581,700 A | 12/1996 | Witte | |
| 8,381,287 B2 | 2/2013 | Trotter | |
| 8,963,855 B2* | 2/2015 | Chen | G06F 21/30 178/18.01 |
| 9,071,618 B1* | 6/2015 | Pruthi | H04L 63/105 |
| 2006/0288229 A1* | 12/2006 | Hamid | G06F 21/31 713/182 |
| 2010/0185870 A1 | 7/2010 | Rane et al. | |
| 2012/0023573 A1* | 1/2012 | Shi | G06F 3/04883 726/17 |
| 2013/0305351 A1* | 11/2013 | Narendra | H04M 1/673 726/19 |
| 2014/0033299 A1 | 1/2014 | McGloin et al. | |
| 2015/0235018 A1* | 8/2015 | Gupta | G06F 21/36 726/19 |

FOREIGN PATENT DOCUMENTS

CN            103686703 A        3/2014

* cited by examiner

*Primary Examiner* — Mohammed Waliullah
(74) *Attorney, Agent, or Firm* — Jeffrey S. LaBaw; David H. Judson (57) ABSTRACT

Mobile device application access is managing by a hierarchical password protection mechanism. In this scheme, a set of passwords is configured in a hierarchy, wherein a password at a higher level in the hierarchy authorizes greater permissions than a password at a lower level in the hierarchy. Each password in the set of passwords is then associated with a respective application group of a set of application groups, each application group comprising applications having a common security requirement. Thus, a given password in the password hierarchy is associated with a particular application group. When the device detects entry of a given password at a given level in the hierarchy, access to the applications in the application group associated with the given password is then enabled automatically. In addition, access to the applications in each application group associated with passwords that are lower in the hierarchy also is enabled.

21 Claims, 6 Drawing Sheets

| APP GROUPS 602 | ACL 604 | FAST ACCESS KEY FOR APPLICATIONS 606 |
|---|---|---|
| GROUP 1 | Xc0786Z#2P | Xc0786Z#2P |
| GROUP 2 | Xc0786Z#2P, 0956 | 0956 |
| GROUP 3 | Xc0786Z#2P, 0956, Z PATTERN | Z PATTERN |
| GROUP 4 | Xc0786Z#2P, 0956, Z PATTERN, SLIDE/SWAP | SLIDE/SWAP |

DIFFERENTIAL HIERARCHICAL-BASED PASSWORD SECURITY MECHANISM FOR MOBILE DEVICE

BACKGROUND

Technical Field

This disclosure relates generally to securing access to applications on a mobile device.

Background of the Related Art

Mobile devices, such as a smartphone or tablet, are in widespread use among consumers. The use of state-of-the-art processors, memory, multi-touch display screens, and the like in these devices enable support of a large number of mobile applications. These devices also support web browsing software.

Users of mobile devices typically have multiple ways to lock their devices to secure access to the applications that run on the device, as well as to the information stored on the device. Depending on the user's security needs, the user can select one of these mechanisms (e.g., none, slide, biometric detection, pin entry, and the like). While these security mechanisms provide the user with lots of flexibility for securing the device as a whole, not all applications running on the device are equal in terms of their confidentiality and security requirements. This problem is exacerbated in the "bring-your-own-device" (BYOD) scenario, wherein enterprise employees use their personal mobile device to connect to enterprise networks to enable them to work from remote locations. In the BYOD scenario, enterprises need to ensure that sensitive enterprise data does not leak through these devices. Accordingly, enterprises often require that the employee implement a complicated (and thus more secure) password before allowing access to the device on which enterprise applications may execute. In this scenario, the resulting password entry requirements may hamper useability of the device severely. For example, to input a password with mixed letters and numbers, and capital and lower case, the user has to switch the soft keyboard at least six (6) times. The problem is worse (and dangerous) when the device is not stable, such as in a moving vehicle. Certain users, such as the elderly or the vision- or motion-impaired, may have physical impairments that make entry of such complex passwords even more problematic. As the password becomes more complex, the likelihood that the user experiences an input error also increases greatly. Depending on the use case, such input error(s) may end causing the entire device to be locked, causing great user frustration.

There remains a need to provide enhanced techniques to enable users to manage access to the mobile device applications while at the same time ensuring that security requirements are enforced for those applications where necessary.

BRIEF SUMMARY

Mobile device application access is managing by a hierarchical password protection mechanism. In this scheme, a set of passwords is configured in a hierarchy such that a password at a higher level in the hierarchy authorizes greater permissions than a password at a lower level in the hierarchy. Each password in the set of passwords is then associated with a respective application group of a set of application groups, each application group comprising zero or more applications having a common security requirement. Thus, preferably a given password in the password hierarchy is associated with a particular application group. Further, each level of the password hierarchy may be associated with a password type, wherein a password type at a higher level in the hierarchy defines a more secure password than a password type at a lower level in the hierarchy.

When the device detects entry of a given password at a given level in the hierarchy, access to the applications in the application group associated with the given password is then enabled automatically. In addition, access to the applications in each application group associated with passwords that are lower in the hierarchy also is enabled. When the user later tries to access an application in an application group associated with a higher level password, however, he or she is prompted for entry of the higher level password.

According to additional aspects, the user may configure an event-responsive password hierarchy, e.g., a hierarchy when the device is determined to meet a certain configurable condition (e.g., movement from a particular location, movement at a particular speed or acceleration, or the like). Further, a particular application group may have an associated virtual home screen that is displayed upon entry of the password for that application group. The home screen may include one or more "hot keys" (e.g., links, icons, or the like) to facilitate "fast access" to the application associated with the key. Also, the password control mechanism may take advantage of pre-configured application group templates, or the user may define a template.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
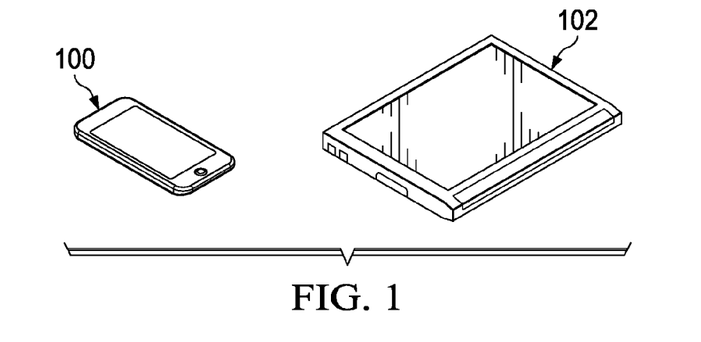
FIG. 1 is an exemplary mobile device or tablet device in which the data protection method of the disclosure is implemented.

FIG. 1 illustrates a known mobile device, such as a smartphone 100 or tablet 102, in which the private data protection mechanism of this disclosure may be implemented. Representative mobile devices include, for example, the Apple iPhone® or iPad®, an Android™-based mobile device, or the like. The disclosed subject matter is not limited for use with any particular device.

Figure 2:
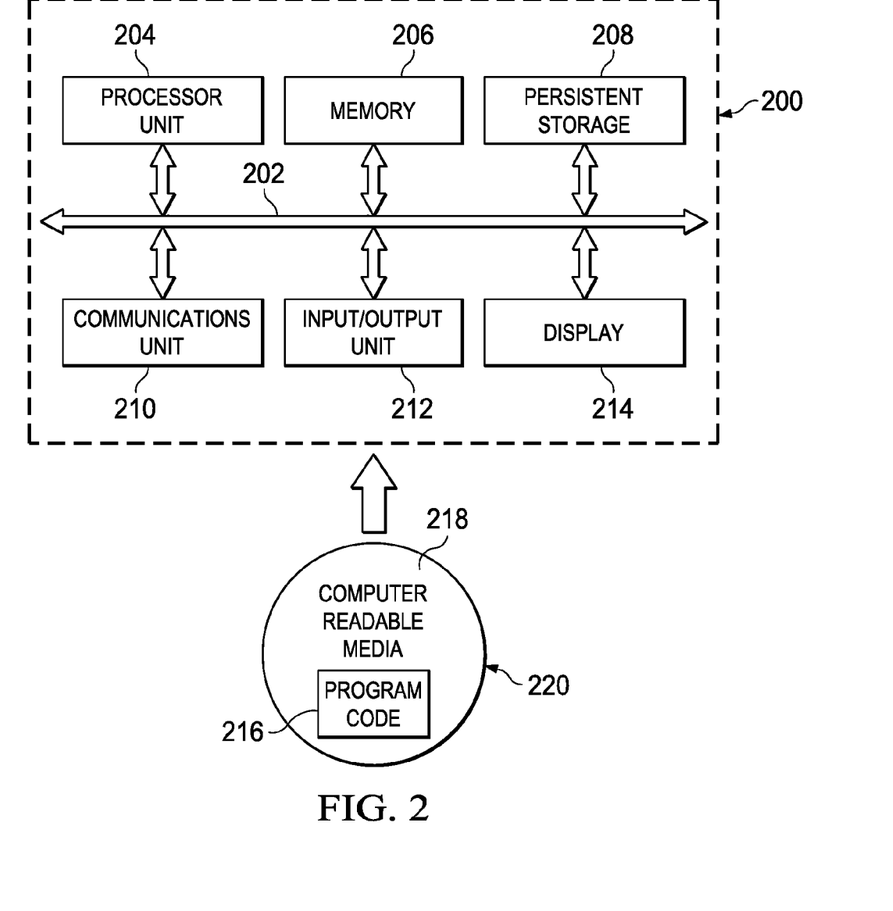
FIG. 2 is an exemplary block diagram of a data processing system in which exemplary aspects of the illustrative embodiments may be implemented.

The subject matter herein is implemented in a computing machine or data processing system. With reference now to FIG. 2, a block diagram of an exemplary data processing system is shown in which aspects of the illustrative embodiments may be implemented. Data processing system 200 is an example of a computer, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the disclosed subject matter may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a wireless local area network (WLAN) or a wide area network (WAN), or the connection may be made to an external computer (for example, through the Internet using an Internet Service Provider).

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted. Also, the processes of the illustrative embodiments may be applied to a multiprocessor data processing system, other than the SMP system mentioned previously, without departing from the spirit and scope of the disclosed subject matter.

Figure 3:
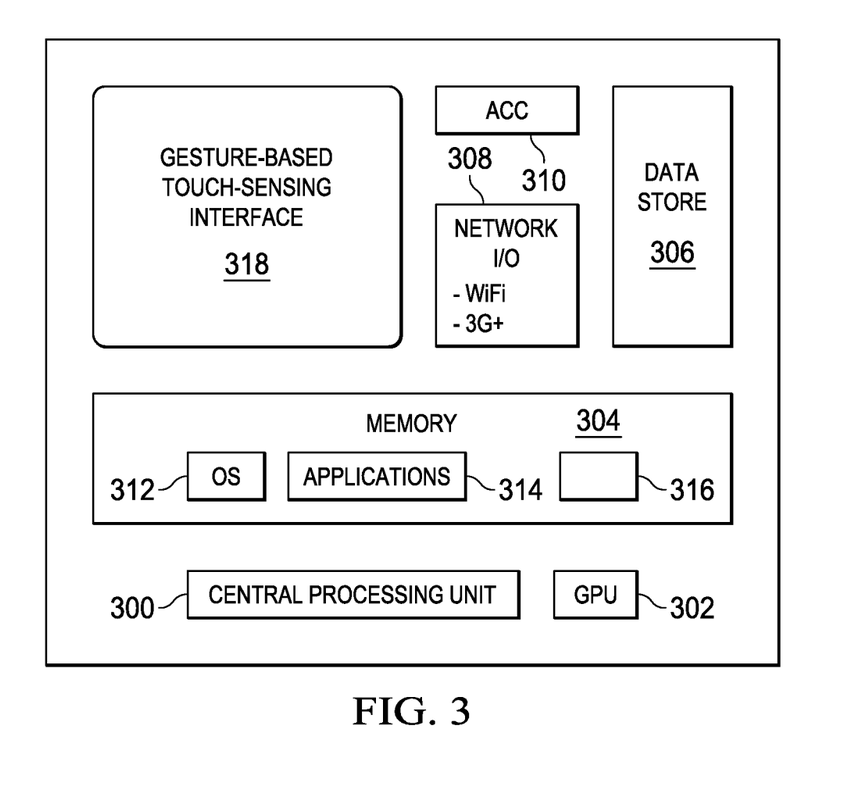
FIG. 3 illustrates representative hardware and software elements of a mobile device in which the subject technique may be implemented.

With the above as background, FIG. 3 illustrates the basic hardware and software components of a mobile device that implements a data processing system such as shown above in FIG. 2. In particular, the device typically comprises a CPU (central processing unit) 300, (such as any Intel- or AMD-based chip), GPU (graphics processing unit) 302, computer memory 304 (such as RAM), flash memory (or equivalent) data storage 306, network I/O 308, and a 3-axis accelerometer 310 (which measures acceleration and indicates the orientation of the device. The device may also include a gyro that measures rate of rotation around a particular axis. The data storage and memory support device software, such as an operating system (e.g., Apple iOS, Google® Android, or the like) 312, mobile applications 314, and generic support applications and utilities 316. One support application is a screen lock function by which the display interface (except for password entry) or the device itself (or some application or the like) is locked, e.g., after a configurable time of inactivity.

The mobile device also includes a touch-sensing device or interface 318 (e.g., a "touch screen") configured to receive input from a user's touch and to send this information to the processors in the device. The touch screen recognizes touches, as well as the position, motion and magnitude of touches on a touch sensitive surface, and the device software facilitates gesture-based control.

The device also may include other devices, interfaces and software including, without limitation, a camera, a GPS client, a biometric sensor/application, one or more audio speakers, and the like.

Generalizing, the mobile device is any wireless client device, e.g., a cellphone, pager, a personal digital assistant (PDA, e.g., with GPRS NIC), a mobile computer with a smartphone client, or the like, that sends and receives data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. A 3G- (or next generation) compliant device also includes a subscriber identity module (SIM), which is a smart card that carries subscriber-specific information, and necessary mobile equipment (e.g., radio and associated signal processing devices) to facilitate communications with the applicable radio access or other wireless network.

Hierarchical Passwords for Differential Security, with Fast Access Keys for Improved Mobility With the above as background, the techniques of this disclosure are now described. In one embodiment, the below-described functionality is implemented in a mobile device application (such as application 314 shown in FIG. 3). The functionality may be provided as part of another mobile device application (having other functions or features), as a function of the device operating system itself, by device-interaction with a web site or web application, or by other such means.

As described, the basic notion of this disclosure is to provide for mobile device application access through a hierarchical password protection scheme. In this approach, it is assumed that applications on the device are not necessarily equal in terms of confidentiality and security requirements. In a typical use case, the device supports various user applications, as well as one or more enterprise applications. This is not a limitation, however, as the techniques herein may be implemented whenever it is desired that access to given applications on the mobile device be enforced differentially, meaning that access to one application on the device does not necessarily provide the user with access to some other application on the device.

Accordingly, and in this approach, preferably there are a set of passwords used to secure the applications (and, at the highest level, the device itself). The passwords are arranged in an "hierarchy" (or the equivalent top-to-bottom data structure) whereby a password that is "higher-up" or "higher" in the hierarchy provides a more significant degree of protection that, say, a password that is "lower" in the hierarchy. Preferably, each password is associated with a level in the hierarchy (a "security level"), and that security level is then associated with an "application group." An application group identifies one or more applications on the device that have a common (i.e., the same or similar) security requirements with respect to their access and use. Each password in the password hierarchy then is used to secure an application group comprising zero or more applications that share that common security requirement for the security level. Preferably, the most-secure password is the one that is at the highest level of the password hierarchy, and it secures access to all of the application groups (and thus all the applications), while a less-secure password is only used to access an application group (and thus some subset of the applications) on the device.

According to this disclosure, entry of a given password in the password hierarchy enables automatic access to the applications in the application group to which the given password is associated, as well as to the applications in each application group that are otherwise accessed by passwords that are lower in the hierarchy than the given password. The reverse, however, is not true. Entry of the given password in the password hierarchy does not enable access to any application in any application group that is accessible by passwords that are higher in the hierarchy than the given password.

Preferably, there is one password per password hierarchy level, and that password is uniquely association with the application group (of zero or more applications). Further, preferably each level of the password hierarchy is associated with a password "type," and wherein a password type at a higher level in the hierarchy defines a more secure password than a password type at a lower level in the hierarchy. Thus, for example, the password "type" for the highest level in the hierarchy might require a password with mixed letters and numbers, and both capital and lower-case. A password for a next highest level in the hierarchy may require a less secure "type," such as a numerical PIN, and so forth.

The number of levels in the password hierarchy may vary depending on the security requirements, the nature of the applications, the source of the applications, and other such considerations.

According to additional aspects, the user may configure an event-responsive password hierarchy, e.g., a hierarchy when the device is determined to meet a certain configurable condition (e.g., movement from a particular location, movement at a particular speed or acceleration, or the like). Further, a particular application group may have an associated virtual home screen that is displayed upon entry of the password for that application group. Thus, entry of the password acts to provide "fast access" to the application group (and thus the applications in that application group). In addition, and to further enhance use-ability, the virtual home screen displayed upon detection of a password may include one or more "hot keys" (e.g., links, icons, or the like) to facilitate "fast access" to the application associated with the key.

Also, the password control mechanism may take advantage of pre-configured application group templates, or the user may define a template.

Figure 4:
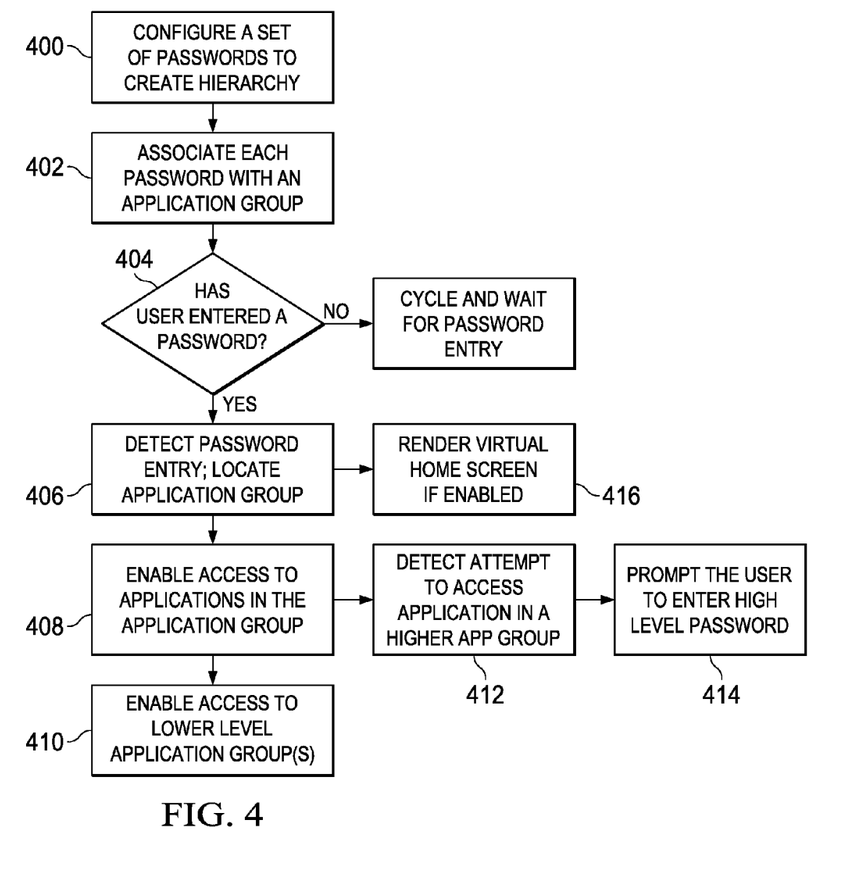
FIG. 4 depicts a high level process flow of the differential security mechanism of this disclosure.

FIG. 4 depicts the basic operating principles of the above-described mechanism. In one typical embodiment, the illustrated steps are carried out by a mobile application that implements the described functionality, as has been described above. In FIG. 4, and as will be seen, typically steps 400 and 402 are configuration steps and are done once (or upon any subsequent updates). Steps 404-414 typically are operating steps that are done for each login.

The technique begins at step 400 by the user configuring a set of passwords to generate the hierarchy. As noted above, a password at a higher level in the hierarchy authorizes greater permissions than a password at a lower level in the hierarchy. At step 402, each password in the set of passwords is then associated with a respective application group of a set of application groups, with each application group comprising zero or more applications having a common security requirement. Thus, and as a consequence of steps 400 and 402, a given password in the password hierarchy is associated with a particular application group. The order of steps 400 and 402 may be reversed, or the operations combined. As noted above, preferably each level of the password hierarchy is associated with a password type, wherein a password type at a higher level in the hierarchy defines a more secure password than a password type at a lower level in the hierarchy. This completes the configuration.

At step 404, the application awaits for entry of a password. This operation may occur at any time during use of the mobile device, e.g., following a given time-out after which the device locks, upon start-up, upon access to a particular function or application, or the like. At 406, a given password at a given level in the hierarchy is detected and matched, and the corresponding application group located. The routine then continues at step 408, wherein access to the applications in the application group associated with the given password is then enabled automatically. At step 410, access to the applications in each application group associated with passwords that are lower in the hierarchy also is enabled. Steps 408 and 410 preferably occur automatically once entry of the given password is detected.

At step 412, security mechanism detects that the user is trying to access an application in an application group associated with a higher level password. Because access to the application group is not permitted by the given password (detected and matched at step 406), the mechanism issues the user a prompt requesting entry of the higher level password that is otherwise required. This is step 414. Control then returns to step 404 to await entry of the higher level password. Unless the higher level password is entered (and matched), access to the application in the application group (associated with the more secure password) is not enabled.

Preferably, and as indicated, once step 408 occurs and access to an application group (and to the application groups protected by lower-level passwords) is enabled, a virtual home screen associated with the application group is displayed on the device interface. This is step 416. The virtual home screen preferably includes number keys, icons, links or other "hot keys" to enable fast access to the applications that comprise the application group. A virtual home screen may also include hot keys to the applications in application groups protected by lower-level passwords. Display of the virtual home screen is not required, and the particular information exposed on the screen (if and when it is displayed) may be predetermined or configurable.

Without intending to be limiting, steps 400 and 402 may be implemented using a configuration tool exposed by the security mechanism, or by some ancillary application (such as a web site configurator). Typically, the configuration tool provides one or more application group templates that can be filled in to generate the application groups, to associate the password(s) with those groups, and that like. The configuration tool may provide password-generation tools, as well as templates for configuring the virtual home screen(s). As noted, the configuration tool may be native to the application, otherwise native to other functions in the device, or accessed remotely via the device interacting with a web site or application. Certain templates (or portions thereof) may be hard-coded into the device.

Figure 5:
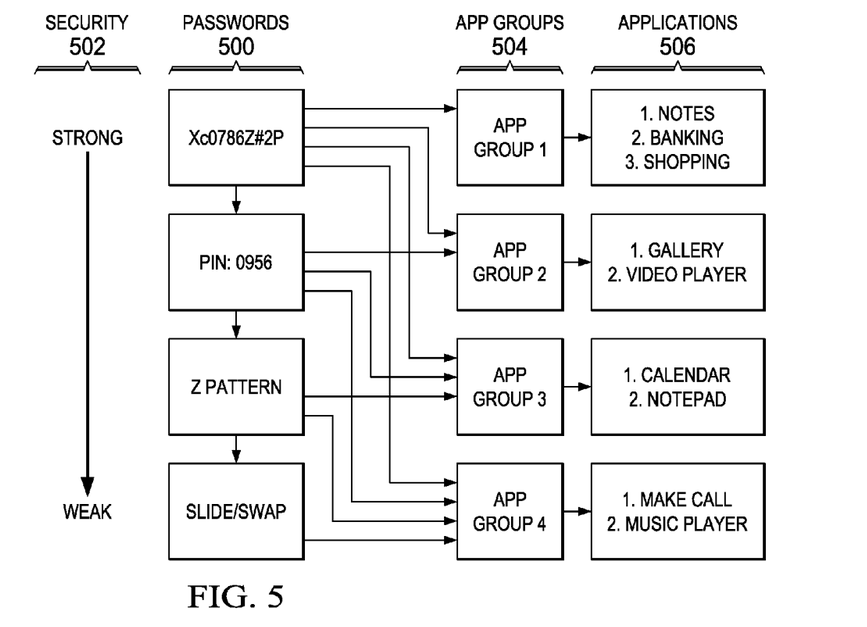
FIG. 5 depicts how the differential hierarchical passwords are associated with application groups according to the techniques of this disclosure.

FIG. 5 illustrates one differential security template that is configured according to the technique described above. The details shown are merely exemplary and should not be taken to limit the disclosed subject matter. In this example, the password hierarchy is represented by the Passwords column 500, and it includes four (4) security levels. The Security column 502 indicates how the hierarchy provides "Strong" to "Weak" levels across a differential spectrum. Each password level (represented by a row) includes a password with a different password type, with the strongest (and most complex) password represented in the top row. As also depicted, the template includes an App groups column 504, which represents the four (4) (in this example) application groups, numbered App group 1 through App group 4. Each application group has a set of applications (and an application group may have no applications) that are set forth in the Applications column 506.

In this example scenario, it is assumed that the most secure password (Xc0786Z#2P) secures access to all the applications (App groups 1-4) including, for example, enterprise applications that are running on (or otherwise accessible from) the device. The less secure password (e.g., pin: 0956) is used to access applications with less secure requirements, including personal applications (such as App groups 3 and 4). The least secure password (which may be an action) can only be used to access applications with the least (or no) security requirements such as making a call, playing music (App group 4). Using the approach described, preferably the user can reconfigure or change the configuration as needed.

Figure 6:
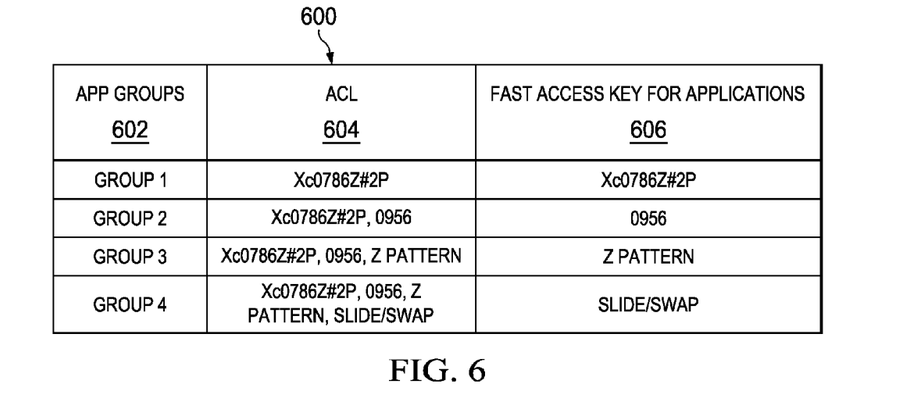
FIG. 6 illustrates representing data structures corresponding to the differential hierarchical passwords and application groups shown in FIG. 5.

FIG. 6 illustrates a representative data structure 600 for supporting the password hierarchy and application groupings shown in FIG. 5. In one embodiment, the data structure is implemented by a virtual folder for each App Group 602. As depicted, each application group has an associated access control list (ACL) 604 that comprises the password associated with that application group, as well as each lower-level password. Thus, the ACL for group 1 is just the password for that application because it is the highest level in the hierarchy. The ACL for group 2 comprises the passwords for the first two levels, the ACL for group 3 comprises the passwords for the first three levels, and the ACL for group 4 comprises all of the passwords. The fast access key column 606 includes the individual password for the application group itself.

Figure 7:
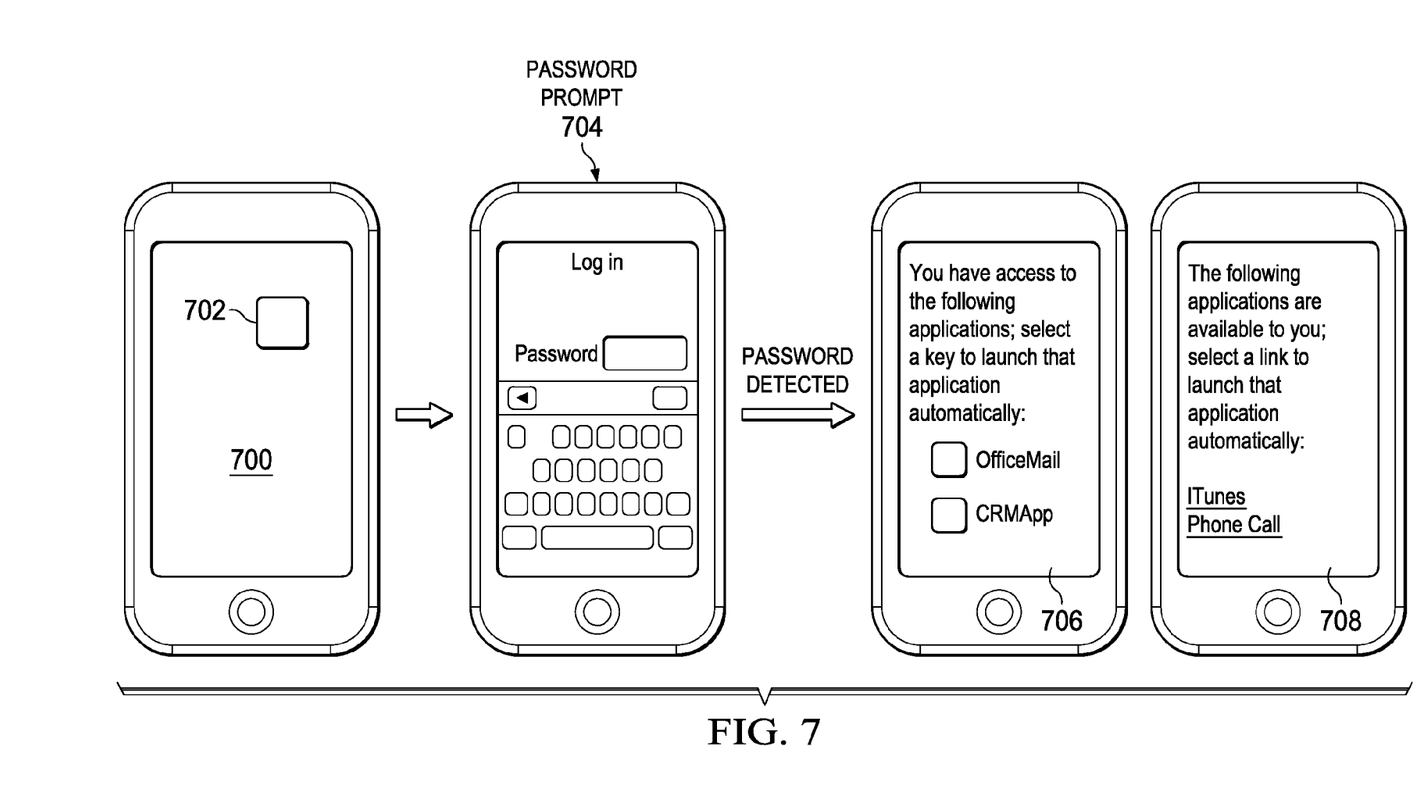
FIG. 7 illustrates how multiple virtual home screens may be configured for each application group according to this disclosure.

FIG. 7 depicts how the entry of a particular password calls up for display a particular virtual home screen, as has been described. In particular, it is assumed that the device is locked (or just started). In this embodiment, the user screen 700 displays icon 702, which opens the security mechanism of this disclosure. At screen 704, the user enters his or her password, which is one of the defined passwords for the password hierarchy. Depending on which password is entered and matched, one or more different virtual home screens 706 and 708 are then exposed to the user. Virtual home screen 706 provides access to enterprise applications. This is the highest level of the password hierarchy. In contrast, virtual home screen 708 only provides access to local user applications that have the lowest security level requirements. Thus, FIG. 7 depicts the virtual home screens for the highest and lowest levels of the sample password hierarchy described above in FIGS. 6 and 7. Each virtual home screen includes the one or more hot keys or links that enable fast access to the application(s) in the respective application groups.

Figure 8:
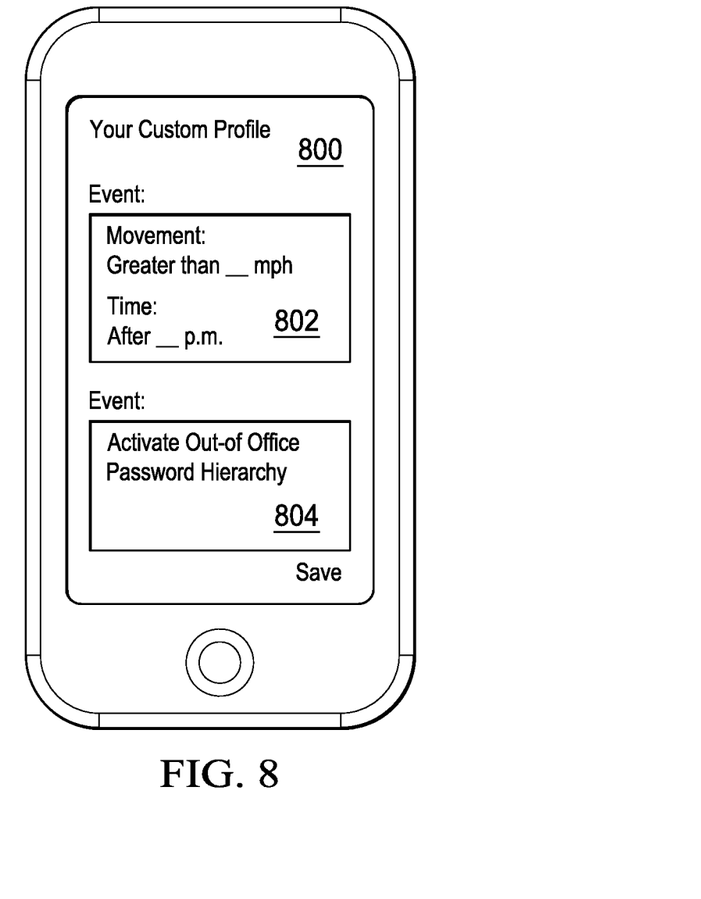
FIG. 8 illustrates a configurator tool to enable a user to create a custom profile to instantiate a particular password hierarchy upon the occurrence of a detected event.

As described above, another aspect of the security mechanism is the option for the user to create (or for the enterprise to otherwise enforce) a custom profile for a particular password hierarchy. The nature and type of custom profile will vary, and this disclosure is not intended to be limited by any particular event/action but rather provides a general mechanism by which various event/action combinations can be defined and enforced on the device. FIG. 8 illustrates this operation by way of an example. In particular, here the user is presented with a configuration screen 800 by which he or she can create an "event" and an "action." Typically, the action is associated with a particular password hierarchy, in this case the "Out of Office" Password Hierarchy. In this example, the user is presented with a pair of pre-configured options to identify events, such as Movement greater than a configurable speed limit (indicating that the device is within a moving vehicle), or Time after a configurable time (indicated that the device is being used "after work" hours). In either case, the event triggers the action, namely, execution of the password hierarchy. Using this type of configurator, the user may create multiple different types of password hierarchies that are then enforced dynamically (or "on-the-fly") depending on occurrence of the specified events in the profile. The nature of the events may be varied in any manner depending on the desired use case(s), the business requirements of the enterprise, or otherwise. The particular profile may be hard-coded by the enterprise in exchange for the user having the right to obtain access to the enterprise applications in the first instance. The configurator may also be used to modify a particular password hierarchy upon the occurrence of any event, e.g., to shift the passwords "up a level" so that additional security requirements are then imposed on the desired access.

Without limitation, typical events may relate to, among other constraints, device location, device movement and device access outside a configured usage pattern, device movement with an associated speed or acceleration, device access with a non-registered biometric, time-of-day, and combinations of such events.

Once the custom profile is defined and selected, the application preferably is executed by the device operating system as a background task so that it can continue to monitor for the security event that has been configured for the profile. Of course, the application may expose functionality to enable multiple profiles to be instantiated and executed concurrently, or for a particular profile to include multiple security events and their associated actions.

The hierarchical password protection mechanism described herein provides numerous advantages. A primary advantage is to differentially secure access to different application groups (and thus applications therein) based on entry of passwords of different type and strength. The approach enables an enterprise to provide its enterprise users with access to enterprise applications but still ensure that those applications are only access under appropriate security constraints (e.g., entry of the highest level passwords). Meanwhile, the user can make use of his or her device under less severe security constraints for non-enterprise-based applications. The technique enables application access to be varied under varying and dynamic operating conditions, preferably in a user- or enterprise-specific customized manner. The password hierarchy can be applied and then modified appropriately based on changing circumstances, thereby providing additional security guarantees. The virtual home screen option enables the user to obtain "fast access" when necessary, thereby also enhancing the use-ability of the device.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Still more generally, the subject matter described herein can take the form of an entirely hardware embodiment, an entirely software embodiment or an embodiment containing both hardware and software elements. In a preferred embodiment, the anomaly detection function is implemented in software, which includes but is not limited to firmware, resident software, microcode, and the like. The data retrieved by the detection device can be configured into a data structure (e.g., an array, a linked list, etc.) and stored in a data store, such as computer memory. Furthermore, as noted above, the private data protection functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the protection application components are implemented in a special purpose computer, preferably in software executed by one or more processors. The associated profile(s) are stored in an associated data store, possibly a secure memory. The software also is maintained in one or more data stores or memories associated with the one or more processors, and the software may be implemented as one or more computer programs.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to a technology or technical field, namely, mobile device security and access control, as well as improvements to the functioning of the mobile device security mechanism itself, namely, by extending its conventional functionality as has been described.

Having described our invention, what we now claim is as follows.

The invention claimed is:

1. A method of providing access to applications on a mobile computing device, the applications including one or more enterprise applications and one or more non-enterprise applications, wherein a first application group consists of one or more enterprise applications and a second application group consists of one or more non-enterprise applications, comprising:
receiving configuration data configuring each of first and second password hierarchies that are distinct from one another, a password hierarchy comprising a set of passwords for the mobile computing device, wherein a password at a higher level in the hierarchy authorizes greater permissions than a password at a lower level in the hierarchy, the password hierarchy also configured by the received configuration data to include an event, and an action to be taken with respect to the password hierarchy upon occurrence of the event;
associating each password in the set of passwords with a respective application group of a set of application groups, each application group comprising zero or more applications having a common security requirement, wherein the first application group has a common security requirement that is more restrictive that the common security requirement of the second application group;
responsive to detecting and matching entry of a given password at a given level in the password hierarchy, automatically providing access to both the applications in the application group associated with the given password, and to the applications in each application group associated with passwords that are lower in the password hierarchy while restricting access to the applications in any application group having an associated password above the given level in the password hierarchy; and
taking the action with respect to the password hierarchy upon occurrence of the event.

2. The method as described in claim 1 wherein each level of the password hierarchy is associated with a password type, wherein a password type at a higher level in the password hierarchy defines a more secure password than a password type at a lower level in the password hierarchy.

3. The method as described in claim 1 further including:
responsive to detecting a request to access an application in an application group associated with a password at a higher level in the password hierarchy than the given level, prompting for entry of the password associated with the higher level in the password hierarchy.

4. The method as described in claim 1 further including associating a display screen with at least one application group of the set of application groups, the display screen including information to facilitate hot key access to a particular application in the application group associated with the display screen.

5. The method as described in claim 4 further including:
automatically displaying the display screen when entry of the password is detected; and
responsive to receipt of an input from a hot key in the display screen, opening the application associated with the hot key.

6. The method as described in claim 1 wherein the event is one of: device location, device movement and device access outside a configured usage pattern, device movement with an associated speed or acceleration, device access with a non-registered biometric, and combinations of such events.

7. The method as described in claim 1 wherein a password at a highest level of the password hierarchy unlocks the mobile device.

8. Apparatus, comprising:
a processor;
computer memory holding computer program instructions executed by the processor to provide access to applications on a mobile computing device, the applications including one or more enterprise applications and one or more non-enterprise applications, wherein a first application group consists of one or more enterprise applications and a second application group consists of one or more non-enterprise applications, the computer program instructions operative to:

receive configuration data to configure each of first and second password hierarchies that are distinct from one another, a password hierarchy comprising a set of passwords for the mobile computing device, wherein a password at a higher level in the password hierarchy authorizes greater permissions than a password at a lower level in the password hierarchy, the password hierarchy also configured by the received configuration data to include an event, and an action to be taken with respect to the password hierarchy upon occurrence of the event;

associate each password in the set of passwords with a respective application group of a set of application groups, each application group comprising zero or more applications having a common security requirement, wherein the first application group has a common security requirement that is more restrictive that the common security requirement of the second application group;

responsive to detecting and matching entry of a given password at a given level in the password hierarchy, automatically provide access to both the applications in the application group associated with the given password, and to the applications in each application group associated with passwords that are lower in the hierarchy while restricting access to the applications in any application group having an associated password above the given level in the password hierarchy; and take the action with respect to the password hierarchy upon occurrence of the event.

9. The apparatus as described in claim 8 wherein each level of the password hierarchy is associated with a password type, wherein a password type at a higher level in the password hierarchy defines a more secure password than a password type at a lower level in the password hierarchy.

10. The apparatus as described in claim 8 wherein the computer program instructions are further operative to:

respond to detecting a request to access an application in an application group associated with a password at a higher level in the password hierarchy than the given level, to prompt for entry of the password associated with the higher level in the password hierarchy.

11. The apparatus as described in claim 8 wherein the computer program instructions are further operative to:

associate a display screen with at least one application group of the set of application groups, the display screen including information to facilitate hot key access to a particular application in the application group associated with the display screen.

12. The apparatus as described in claim 11 wherein the computer program instructions are further operative to:

automatically display the display screen when entry of the password is detected;

responsive to receipt of an input from a hot key in the display screen, open the application associated with the hot key.

13. The apparatus as described in claim 8 wherein the event is one of: device location, device movement and device access outside a configured usage pattern, device movement with an associated speed or acceleration, device access with a non-registered biometric, and combinations of such events.

14. The apparatus as described in claim 8 wherein a password at a highest level of the password hierarchy unlocks the mobile device.

15. A computer program product in a non-transitory computer readable medium for use in a data processing system, the computer program product holding computer program instructions which, when executed by the data processing system, provide access to applications on a mobile computing device, the applications including one or more enterprise applications and one or more non-enterprise applications, wherein a first application group consists of one or more enterprise applications and a second application group consists of one or more non-enterprise applications, the computer program instructions operative to:

receive configuration data to configure each of first and second password hierarchies that are distinct from one another, a password hierarchy comprising a set of passwords for the mobile computing device, wherein a password at a higher level in the hierarchy authorizes greater permissions than a password at a lower level in the hierarchy, the password hierarchy also configured by the received configuration data to include an event, and an action to be taken with respect to the password hierarchy upon occurrence of the event;

associate each password in the set of passwords with a respective application group of a set of application groups, each application group comprising zero or more applications having a common security requirement, wherein the first application group has a common security requirement that is more restrictive that the common security requirement of the second application group;

responsive to detecting and matching entry of a given password at a given level in the password hierarchy, automatically provide access to both the applications in the application group associated with the given password, and to the applications in each application group associated with passwords that are lower in the password hierarchy while restricting access to the applications in any application group having an associated password above the given level in the password hierarchy; and take the action with respect to the password hierarchy upon occurrence of the event.

16. The computer program product as described in claim 15 wherein each level of the password hierarchy is associated with a password type, wherein a password type at a higher level in the password hierarchy defines a more secure password than a password type at a lower level in the password hierarchy.

17. The computer program product as described in claim 15 wherein the computer program instructions are further operative to:

respond to detecting a request to access an application in an application group associated with a password at a higher level in the password hierarchy than the given level, to prompt for entry of the password associated with the higher level in the password hierarchy.

18. The computer program product as described in claim 15 wherein the computer program instructions are further operative to:

associate a display screen with at least one application group of the set of application groups, the display screen including information to facilitate hot key access to a particular application in the application group associated with the display screen.

19. The computer program product as described in claim 18 wherein the computer program instructions are further operative to:
- automatically display the display screen when entry of the password is detected;
- responsive to receipt of an input from a hot key in the display screen, open the application associated with the hot key.

20. The computer program product as described in claim 15 wherein the event is one of: device location, device movement and device access outside a configured usage pattern, device movement with an associated speed or acceleration, device access with a non-registered biometric, and combinations of such events.

21. The computer program product as described in claim 15 wherein a password at a highest level of the password hierarchy unlocks the mobile device.

* * * * *